Sept. 1, 1936.   H. F. PÉTOT   2,052,794
ROTARY FLUID METER
Filed Dec. 13, 1933

Henry François Pétot
INVENTOR
By Otto Munk
his ATTY.

Patented Sept. 1, 1936

2,052,794

UNITED STATES PATENT OFFICE 2,052,794

ROTARY FLUID METER

Henry François Pétot, Montrouge, France

Application December 13, 1933, Serial No. 702,192
In France December 23, 1932

4 Claims. (Cl. 73—231)

It is a known fact that fluid meters may be divided into two different great classes: meters for volume and meters for speed.

Meters for volume are operated for instance by a piston alternately sliding in a cylinder. The output of these meters is equal to the product of the volume generated by one displacement of the sliding element, by the number of such alternate displacements.

An objection which can be made in connection with these meters resides in the fact that it is difficult to represent a phenomenon of a hydraulic nature by the kinematic action of complicated mechanisms, which are always situated in the water or other fluid to be measured and which comprise masses in an alternate or oscillating motion passing through dead centres. This kind of apparatus requires constant inspection and upkeep, if it is desired to maintain its metering qualities. It is thus evident that these meters are expensive.

Meters for speed, which pertain to the second class, are more used in practice. Their operation is based upon a rotary motion, this motion being more rational than the oscillating or alternate motion, and moreover avoiding all dead centres.

In meters for speed the number of revolutions of the movable element, suitably adjusted by preliminary experiments, is registered by a wheelwork. These experiments determine the formula connecting the speed V of the fluid with the number $n$ of effected revolutions.

Several formulæ such as $V=f(n)$ represent this speed as a function $f$ of the number $n$ and permit of determining the speed V corresponding to a certain number $n$.

Rateau has proposed the formula:

$$V=An+B+\frac{C}{V}$$

wherein A, B, C, are certain coefficients depending upon the resistance which the meter opposes to the flow of the liquid and of the friction effects. The last two terms are usually negligible in the case of speeds situated between 0.50 m. and 1 m. per minute. Thus the curve representing the relationship of the speed and of the number of revolutions is represented practically by a straight line, if the coefficients A and B are given any suitable values.

If a series of tests are performed, a number of points $Vn$ will be calculated and the revolutions $n_1 n_2 \ldots$ will correspond to the speeds $V_1, V_2 \ldots$ Thus a certain number of equations such as:

$$V_1=An_1+B$$

will be established.

The testing operations permit finally of choosing the most probable values of A and B, by the method of least squares for instance, or graphically by placing on a diagram the registered points of co-ordinates $V_1$ and $n_1$. The formula for the output:

$$Q=SV$$

(wherein Q is the output, S the flow cross-sectional area and V the speed), may be then used, but in fact, the curve $V=f(n)$ becomes a straight line only after the fluid has assumed a suitable speed.

In fact, in the case of small outputs, the meters for speed must nevertheless overcome the inertia of the movable masses; and these latter begin to rotate and to register only after the fluid has assumed a certain speed.

Furthermore, a certain invariable volume exists between the fixed and the movable elements. This volume is too great with small outputs or too small with large outputs. In fact, should the output be small the fluid will directly pass through the meter without causing this latter to turn. Moreover, for various reasons, the whole quantity of kinetic energy of the fluid is not entirely employed by the movable element at the different outputs.

Due to these two causes, the curve $$V=f(n)$$

differs the more from the straight line corresponding to $$V=An+B,$$

the lower the speed of the fluid. In fact, the indications given by the usual meters for speed are exact only within +3%, which is admissible in the case of the output reaching 20, 30, 40, etc. . . . litres per minute with water meters of usual capacity.

The present invention has for its object a fluid meter for speed, presenting no such drawbacks, commencing metering at a very slow speed and thus having a very small percentage of error at slow speeds.

This meter is remarkable in that it comprises a fixed and a rotary element, which are so arranged that the volume or space between them is nil before the starting of the apparatus and increases up to a maximum value when the output of the fluid increases.

According to an embodiment, the rotary element consists of a male body of revolution (cone, paraboloid or the like) and is located in a female body having an analogous form, the flow section between these two pieces being determined by the relative displacement of both said elements with reference to their common axis of revolution, and the male element being actuated as to rotation by the fluid, admitted between these two elements.

The rotary male element is preferably provided on its surface and on a part of its height with grooves, in order to be struck by the fluid issuing tangentially through suitable nozzles provided in the female body.

Other features will be set forth in the following description and with reference to the drawing.

In the accompanying drawing, given solely by way of example:

Figure 1:
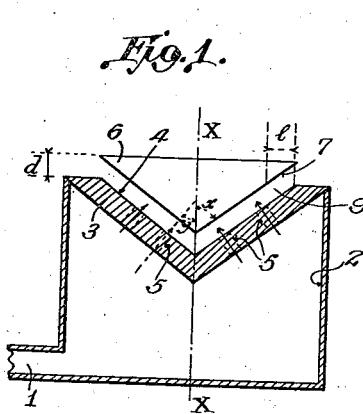
Figure 1 is a diagrammatic section of a meter according to the invention.
Figure 2:
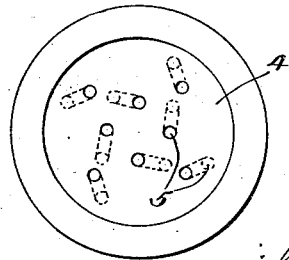
Figure 2 is a plan view of the female body of revolution.

According to the example of execution represented in Figure 1, the fluid to be measured enters through a conduit 1 having a cross-sectional area S, into a fluid-tight space 2. Space 2 is closed at the top by a piece 3 the upper surface 4 of which assumes the form of a body of revolution about the axis X—X. This surface may for example be a cone, a paraboloid, etc. In piece 3 are formed nozzles 5. These nozzles 5 are so inclined as to make with the axis X—X an angle $y$, as seen in elevation which may be either the same or different for the various nozzles; the apex of this angle is anyhow located at the top. In plan (Figure 2) these nozzles are substantially tangent to the circumference of the perpendicular section into which they open.

A male piece 6 is freely placed on surface 4 and has a suitable weight. The surface 7 of piece 6 corresponds exactly to the form of surface 4. This piece 6, which is somewhat floating in piece 3, is connected in any suitable way, for example in the manner further indicated, to a wheel work of any kind.

The operation is the following: as soon as the slightest flow of fluid begins, for instance should a cock placed on the downstream side be opened, piece 6 rises, so as to permit the fluid of passing through the space of circular section provided between surfaces 4 and 7. This rise is obviously accompanied by a rotation about its vertical axis of piece 6, this rotation being due to the fact that the fluid stream impacts on surface 7, in a tangential direction when issuing from nozzles 5. Thus the rotary element is supported by the fluid which due to the inclination of the delivery conduits 5 in piece 3 forms a flux within this latter element. Moreover, as the rotary element assumes substantially the form of a top it always is in equilibrium upon the flux of fluid. The rotation can be accelerated by using small grooves 8 (see Figure 3) provided on surface 7 and along the generatrices thereof and serving as paddles; obviously, these grooves should not extend as far as the top of surface 7 in order to leave on the whole periphery of this bottom part a smooth portion assuring fluid-tightness between surfaces 4 and 7 when piece 6 rests in piece 3.

It should be observed that when the output is small, space 9 (Figure 1) is also small, but should this be the case, body 6 is nevertheless set in rotation.

It is easy to have a very exact measurement of the outputs, as the volume between fixed surface 4 and movable surface 7 or cross-sectional area S′ are a function of the variable quantity V.

When writing that the output at the inlet of the meter is the same as at the outlet, one has:

$$Q=SV$$
$$Q=S'V'$$

S being the cross-sectional area of conduit 1 and V the speed therethrough and S′ the cross-sectional area between surfaces 4 and 7, and V′ the corresponding speed of the fluid.

But, in the first equation, S is constant and V alone varies, whilst in the second equation, S′ is a function of V′.

It is evident that it becomes possible to seek in this type of meter the precise characteristics which permit of obtaining a great sensitiveness and a great exactness.

It is easy to determine the optimum angle $x$ measured between axis X—X and lower surface of rotor 6 in order to have a minimum vertical rise $d$ of the piston. Should $l$ be the space separating rotor 6 and stator 3 measured in a horizontal plane, the following equation would subsist:

$$d=l \cot x$$

This relation brings the conclusion that in the case of a given hydraulic factor, or conduit 1 having a given intake, it is necessary to have $x$ as large as possible.

It is also possible to determine the weight of piece 6, taking account of the thrust of the fluid, in order to calculate the commencing of the metering.

Finally, it is easy to determine, mathematically, the shape to be given to piece 6 in order to obtain the best yield and the best equilibrium. Among all the surfaces of revolution which might be employed, the paraboloid seems to fulfill and to comprise the best conditions.

This being the case, one may also compare the principle of this meter with that of meters for speed.

At small speeds, these latter meters cannot readily start as the fluid passes through the space between the fixed and the movable elements, without overcoming the inertia of the movable element. Finally, the movable element (paddle wheel) operates badly at different outputs. The jets of admission to the paddles are not only of different forces for the same output, but, according to the speeds, these jets take variable inclinations, whilst the paddles maintain invariable directions.

In the meter according to the invention, on the contrary, space 9 increases from a zero value to a maximum, and, hence, no quantity of fluid can pass between fixed element 3 and movable element 6 before the inertia of the latter is overcome: that is the principle of the meter for volume, but with this advantage that body 6, which may be hollow, can be perfectly equilibrated as to weight by the thrust of the liquid. The starting of this meter will thus be better than that of the meters for volume. Moreover, all friction between the movable and the fixed surfaces is eliminated.

Due to the fact that the fixed element has on its middle periphery a set of tangential nozzles 5, the jets are adjusted so as to obtain a flux of fluid inside of piece 6, and thereby uniformly distribute the power upon piece 6 and obtain a perfectly equilibrated rotary element.

Figure 3:
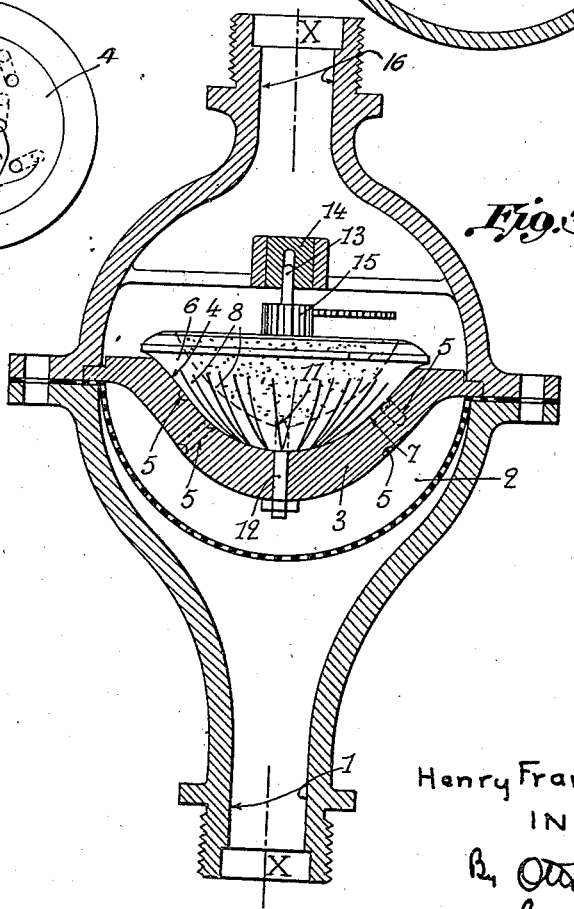
Figure 3 is a longitudinal section of a modification of the said meter.

Any body of revolution can obviously be used as movable element 6. In Figure 3 a hollow paraboloid of revolution has been shown. The movable part thus remains perfectly equilibrated and standardized according to the thrust of the fluid. The inner surface of the hollow paraboloid is parallel to the outer surface 7. The ballast, during the rotation of element 6 takes itself the form of a paraboloid.

The outer surface 7 is provided with grooves 8. These grooves gradually disappear on the upper ring-shaped part which is quite smooth, and which forms a joint between fixed surface 4 and movable surface 7.

A hole 11 is formed at the apex of the movable paraboloid and a bearing 12 is inserted therein, the point of said pivot being shaped as a cone or sphere.

Spindle 13 of movable paraboloid 6 is guided by a bearing 14 at the upper part of the paraboloid. This bearing 14 is separated from the upper face of piece 6 when at rest, by a length exceeding the vertical rise $d$ of the paraboloid during the maximum output.

Spindle 13 carries a pinion 15 which meshes with the wheelwork.

The direction of the inlet and outlet of the fluid may be situated in horizontal planes, and may form any desired angle. It is also possible to locate the two conduits 1 and 16 according to the same vertical axis X—X.

As the male body is situated over the inlet orifice, it forms a valve permitting no return flow of the fluid and dispensing therefore with the use of any particular valve, which would be adapted to prevent deficiencies, return flow and effects of hydraulic recoils.

It permits the exact measurement of water and other liquids, gases, illuminating gas, vapours, air, etc.

Figure 4:
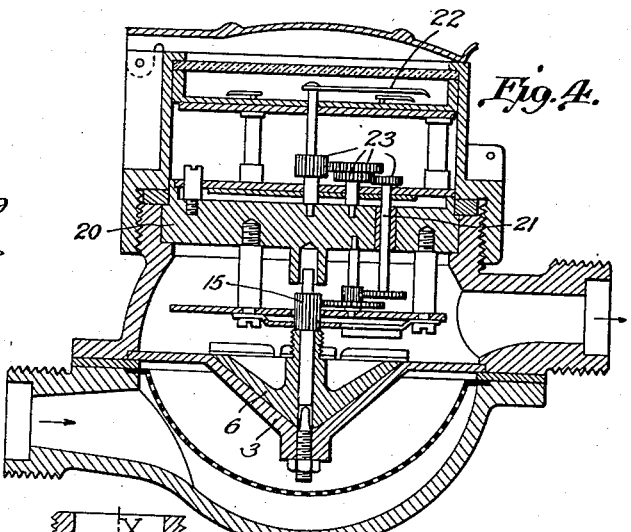
Figure 4 is a cross section of a meter according to the invention provided with its registering means.

Fig. 4 shows a meter according to the invention provided with its registering means, which may be of any usual type. In the present case, the space wherein these registering means are located is separated from the space containing the fluid by a plate 20 wherethrough passes spindle 21 transmitting its movement to the index 22 through the intermediary of gearwheels 23.

Obviously, the invention is by no means limited to the method of execution represented and described which has been chosen only by way of example.

Having now described my invention what I claim as new and desire to secure by Letters Patent is:

1. A fluid meter comprising a fluidtight casing, fluid admission and outlet chambers therein, a stationary concave element between said chambers, provided with perforations on its bottom, having the shape of a surface of revolution and intended to create a flux of fluid inside its inner space, a rotary and axially movable convex element having an apex and the shape of a body of revolution corresponding to that of said concave element, freely located in said concave element, and adapted to normally rest in said stationary element and to obturate the perforations therein and thereby the fluid passage therethrough, and registering means connected with said element and responsive to the rotation thereof, said rotary element while remaining in equilibrium being lifted, rotated and supported by the flux of fluid produced inside of said concave element, when fluid is admitted into the meter.

2. A fluid meter according to claim 1 wherein the direction of the perforations of the stationary element is tangential with respect to the outer surface of the movable element.

3. A fluid meter as claimed in claim 1 wherein said stationary element consists of a female piece having substantially the shape of a cone of revolution and the rotary element consists of a male piece of corresponding shape adapted to fit within said female piece.

4. A fluid meter as claimed in claim 1, wherein said stationary element consists of a female piece having a substantially paraboloidal shape and the rotary element consists of a male piece of corresponding shape adapted to fit within said female piece.

HENRY FRANÇOIS PÉTOT.